(12) United States Patent
Reed et al.

(10) Patent No.: US 7,291,799 B2
(45) Date of Patent: Nov. 6, 2007

(54) ELECTRODE DRESSING TEMPLATE

(75) Inventors: Gordon M. Reed, Plantsville, CT (US); Gary J. Larson, Madison, CT (US)

(73) Assignee: United Technologies Corporation, Hartford, CT (US)

( * ) Notice: Subject to any disclaimer, the term of this patent is extended or adjusted under 35 U.S.C. 154(b) by 65 days.

(21) Appl. No.: 11/260,352

(22) Filed: Oct. 27, 2005

(65) Prior Publication Data

US 2007/0095796 A1    May 3, 2007

(51) Int. Cl.
*B23H 1/04* (2006.01)
*B23H 1/06* (2006.01)

(52) U.S. Cl. .............. 219/69.15; 219/69.17; 451/443

(58) Field of Classification Search ........ 219/69.15, 219/69.17; 451/443; 384/276
See application file for complete search history.

(56) References Cited

U.S. PATENT DOCUMENTS

| | | | |
|---|---|---|---|
| 3,963,283 A * | 6/1976 | De Feo et al. ........... 384/276 |
| 4,365,133 A | 12/1982 | Inoue | |
| 4,596,066 A * | 6/1986 | Inoue ................. 219/69.17 |
| 4,786,777 A | 11/1988 | Rupert | |
| 4,850,147 A | 7/1989 | Baker | |
| 6,540,597 B1 * | 4/2003 | Ohmori ................. 451/443 |
| 6,566,623 B2 * | 5/2003 | McPhillips ........... 219/69.17 |
| 6,752,708 B1 * | 6/2004 | Kinoshita et al. ........ 451/443 |
| 2006/0231530 A1 * | 10/2006 | Beaumont et al. ..... 219/69.15 |
| 2006/0237395 A1 * | 10/2006 | Yamada ............... 219/69.17 |

FOREIGN PATENT DOCUMENTS

WO    WO-2005/113182 A1 * 12/2005

* cited by examiner

*Primary Examiner*—Geoffrey S. Evans
(74) *Attorney, Agent, or Firm*—Colin L. Cini

(57) ABSTRACT

Disclosed are various embodiments of an EDM electrode dressing template comprising a body made of an electrically conductive material. Bonded to the body is a pad with an electrically conductive material with hardness greater than the body. An electrode with an eroded end is positioned proximate the pad and a DC current pulses between the eroded end and the pad. After a period of time, the eroded end is shaped into a dressed tip. Since the pad is less susceptible to spark erosion than the body, the electrode is more consistently dressed and the template is replaced less frequently.

6 Claims, 3 Drawing Sheets

ELECTRODE DRESSING TEMPLATE

BACKGROUND OF THE INVENTION (1) Field of the Invention

The invention relates to Electro-Discharge Machining (EDM) and more specifically to a template for dressing a new or worn EDM electrode to a predetermined length and angle.

(2) Description of the Related Art

Articles such as fuel injectors and high-temperature gas turbine engine components often contain small diameter, close tolerance holes that are drilled during their manufacture. Turbine engine components such as blades, vanes and outer shroud segments require dense patterns of small diameter holes for cooling purposes. Interior conduits introduce pressurized compressor air inside the components and the holes discharge the air as a protective film that shields the components from high temperature combustion gases. The film holes are typically 0.012 inch-0.035 inch, (0.305 mm-0.889 mm), in diameter or have comparable sized non-circular shapes. The holes are strategically positioned on the component's surface in order to ensure the most effective film protection.

Due to their extremely small size, accurate positioning requirements, and vast quantity, film holes are typically manufactured using Computerized Numerically Controlled (CNC) laser and/or Electro-Discharge Machining (EDM) work centers. Laser drilling is generally limited to near-round film holes where a line of sight exists from the laser to the film hole location. Film hole locations without a line of sight or film holes having shapes not attainable using laser are drilled using EDM. An example of an EDM work center is disclosed in U.S. Pat. No. 4,044,216 to Check et al, which is herein incorporated by reference.

EDM is a process of controlled electrical erosion of an electrically conductive material. Both the tool and the article are submerged in a circulating dielectric fluid such as hydrocarbon oil or deionized water for example. A direct current of low voltage and high amperage is delivered to the electrode at the rate of approximately 20000 Hz. The electrical impulses become sparks, which jump a 0.001-inch (0.02 mm) gap between the electrode, through the dielectric fluid, to the article. If the gap is too large, ionization of the dielectric fluid does not occur and machining cannot take place. If the gap is too small, the tool and workpiece may weld together. Intense heat is created in the localized area of the spark impact, causing the article material to melt. Molten material is expelled from the article and carried away by the dielectric fluid. The dielectric fluid also assists in dissipating the heat generated by the spark.

EDM electrodes are typically made from tungsten carbide, copper tungsten, silver tungsten, yellow brass, copper, chrome-plated materials, graphite and zinc alloys. Machinability, electrical conductivity and cost are considerations in electrode material selection; however, each application dictates the selection of the electrode material and shape. The cross sectional profile of the electrode is made in the shape of the film hole required. A single electrode may be used, or multiple electrodes may be ganged together to drill a series of holes in a particular pattern simultaneously. Electrodes may be solid or may be hollow to allow the dielectric fluid to flow through, directly to the spark gap location. During the EDM machining process, an electrode is subject to erosion caused by the sparking action. For multiple electrode setups, one or more electrodes may erode at a faster rate than others. As a result, it is difficult to maintain tight machining tolerances as an electrode gradually erodes.

Due to the extensive set up time and replacement cost of new electrodes, a trimming or finishing process is normally used to dress an eroded electrode so it may continue in service. Essentially, the eroded portion of the electrode is removed to expose a portion of the electrode with original dimensions. An electrode may need to be dressed before each consecutive article is machined or, in some applications, even more frequently. One technique for dressing an electrode is disclosed in U.S. Pat. No. 4,786,777 to Rupert. According to the '777 patent, a laser source is focused on the tip of a worn electrode to disassociate the worn tip from the electrode to reshape it in a desired, unworn configuration without the formation of burrs and whiskers on the tip end.

Another technique for dressing an electrode is disclosed in U.S. Pat. No. 4,850,147 to Baker. According to the '147 patent, a worn electrode is fed tangentially into a peripheral groove in a grinding element to impart a complimentary profile to the electrode.

Yet another technique for dressing an electrode is disclosed in U.S. Pat. No. 4,365,133 to Kiyoshi. According to the '133 patent, the worn tool electrode is positioned in close proximity to a belt electrode that travels between a supply reel and takeup reel. A DC current pulses between the worn tool electrode and the belt electrode. As a portion of the belt electrode erodes, it is advanced on the takeup reel to expose an uneroded surface for use in the next dressing cycle.

A particular disadvantage of the above-described techniques is the elaborate set up and specialty tooling requirements needed to implement them. This adds time and cost to the EDM operation.

Yet another technique for dressing an electrode 10 involves dressing the eroded electrode end 12 using a template 14 as shown in FIG. 1. An electrode 10 is first advanced in a holder 16, so an eroded end 12 extends beyond a dressed length (L), which is the distance from the holder 16 to the dressed end 18. A DC current 20 pulses between the eroded end 12, and the template 14. After a period of time, the eroded end 12 is shaped into a dressed end 18. The dressed end 18 is formed to a predetermined length (L) and angle (Alpha) by a dressing plane 22 and a dressing angle (Alpha) of the template 14.

Although the above-described technique has the advantage of utilizing less elaborate and specialized tooling, there are also disadvantages. Because the template 14 is typically made of a material with hardness that is identical or comparable to the electrode 10, the template 14 develops holes 24 caused by extended spark erosion. The depth (D) of the holes 24 increases with the number of electrode 10 dressings. As the depth (D) of the erosion holes 24 increases, each successive eroded end 12 is only moderately dressed. Instead of being dressed to a length (L), the dressed end 18 is dressed to a length greater than length (L). A moderately dressed end 18 is longer than required and can lead to article defects such as, an unacceptably deep hole, incorrect hole positioning, incorrect hole shape, or a short circuit between the electrode 10 and the article at the start of the EDM operation. Since none of these conditions is acceptable and can lead to damaged articles, dressing templates 14 are frequently replaced. Frequent replacement of dressing templates 14 is time consuming and adds additional cost to the EDM operation.

What is therefore needed is an EDM electrode dressing template 14 that is less susceptible to spark erosion, thereby improving hole quality and reducing the time and expense of the EDM operation.

BRIEF SUMMARY OF THE INVENTION

In accordance with the present invention, there is provided an EDM electrode dressing template with improved resistance to spark erosion, thereby improving hole quality and reducing the time and expense of the EDM operation.

The template comprises a body made out of an electrically conductive material. Bonded to the body is a pad with an electrically conductive material of hardness greater than the body. The eroded end is positioned proximate the pad and a DC current pulses between the eroded end and the pad. Since the pad is less susceptible to spark erosion than the body, the electrode is more consistently dressed and the template is replaced less frequently.

Other details of the present invention, as well as other objects and advantages attendant thereto, are set forth in the following detailed description and the accompanying drawings wherein like reference numerals depict like elements.

DETAILED DESCRIPTION OF THE INVENTION

Figures 1, 1A:
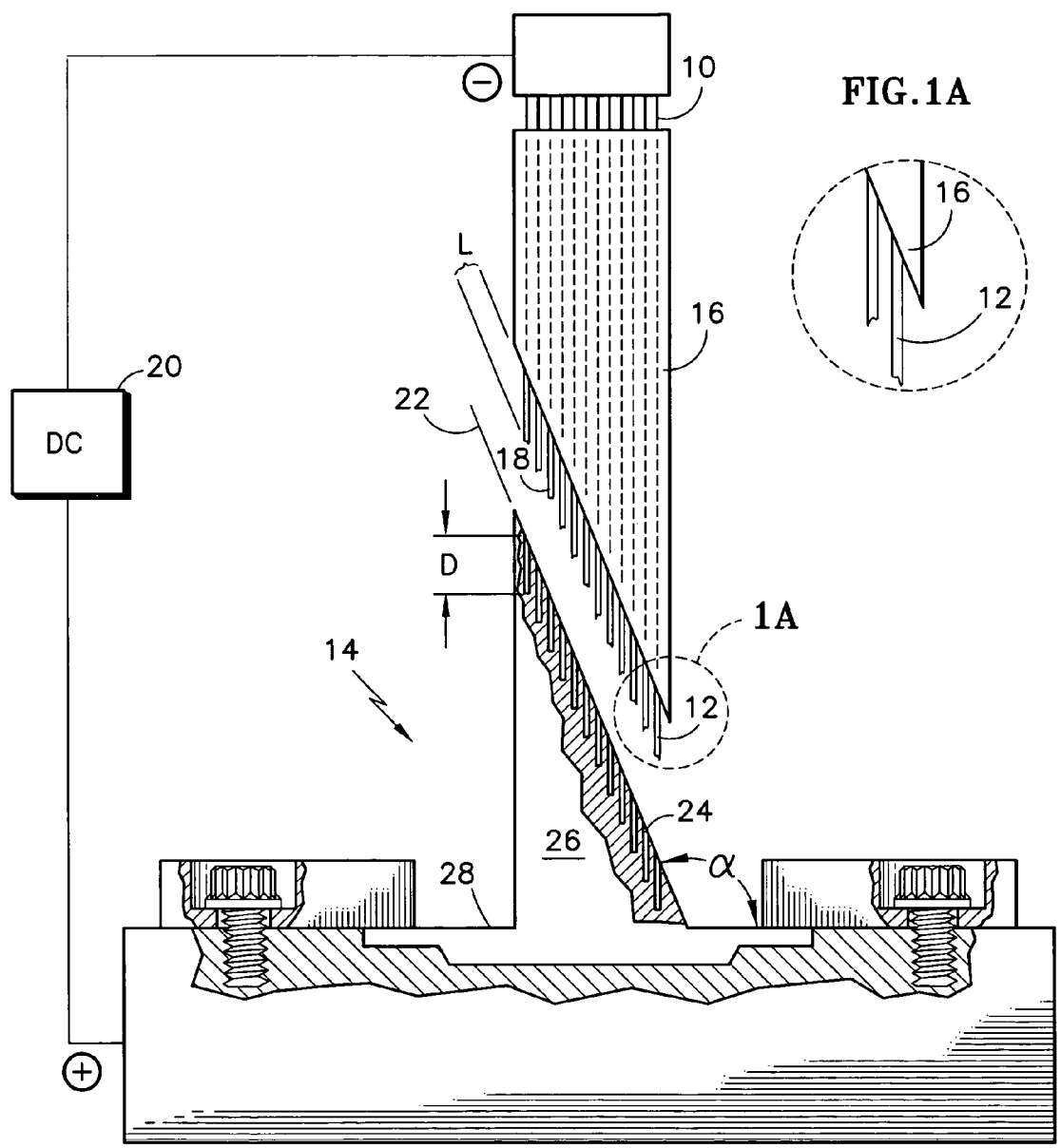
FIG. 1 illustrates a simplified side view of a prior art dressing template installed in a portion of an EDM machine.
FIG. 1a illustrates a detailed view of an eroded tip of an EDM electrode.
Figure 2:
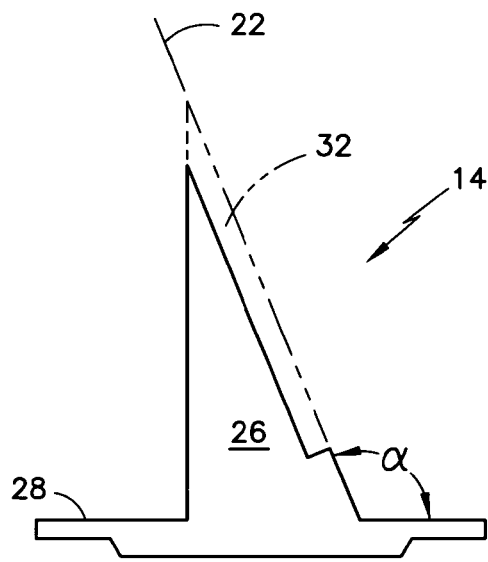
FIG. 2 illustrates a side view of a dressing template according to an embodiment of the present invention prior to assembly.
Figure 3:
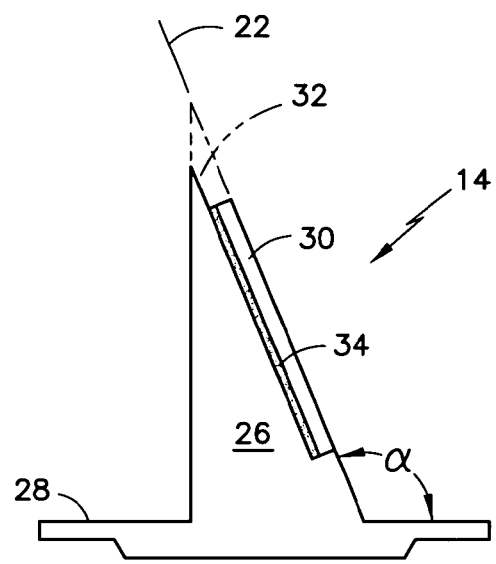
FIG. 3 illustrates a side view of a dressing template according to an embodiment of the present invention fully assembled.
Figure 4:
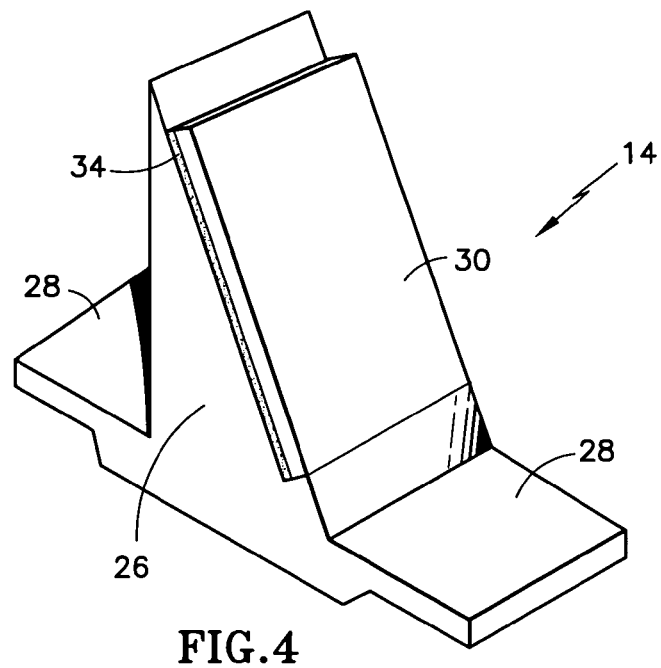
FIG. 4 illustrates an isometric view of a dressing template embodiment, according to an embodiment of the present invention, fully assembled.
Figure 5:
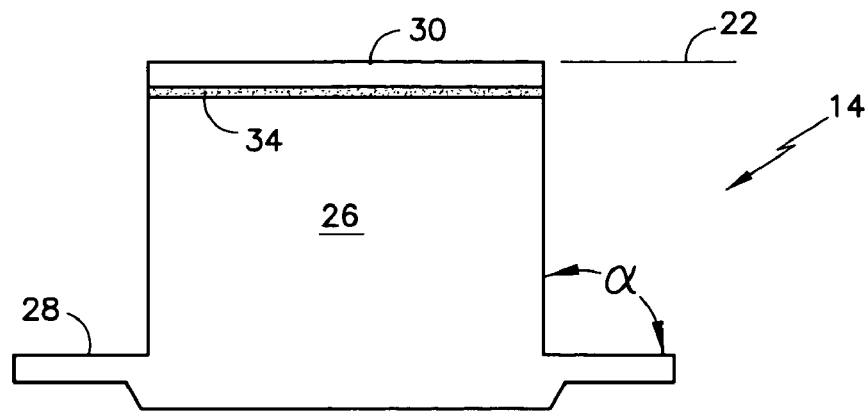
FIG. 5 illustrates a side view of a dressing template, according to another embodiment of the present invention, fully assembled.
Figure 6:
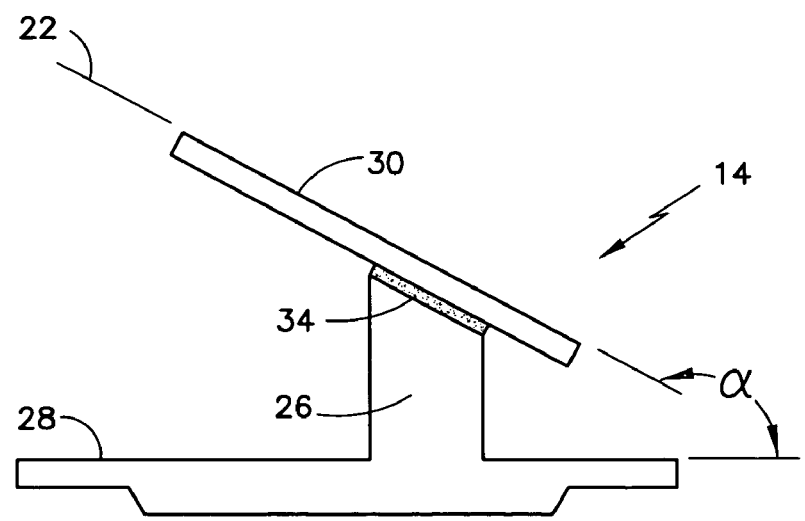
FIG. 6 illustrates a side view of a dressing template, according to yet another embodiment of the present invention, fully assembled.

Referring now to FIGS. 2-6, an EDM dressing template 14 broadly comprises a body 26 disposed between a base 28 and a spark erosion resistant pad 30. The body 26 and base 28 are comprised of an electronically conductive material such as copper, brass or other suitable material with hardness comparable to the electrode 10. The body 26 may be made by casting, forging, machining, or any other suitable manufacturing means. In the exemplary body 26, a copper alloy material with hardness between approximately (50-100) on the Brinell hardness scale was used. The body 26 and base 28 may be integrally formed as shown in the figures, or multiple elements may be joined by brazing, welding, or other bonding means (not shown). The base 28 locates the body 26 and pad 30 at the correct height and angle in relation to the holder 16. The body 26 may contain a pocket 32 for accepting the pad 30 as illustrated in FIGS. 2-4, or it may be flat as illustrated in FIGS. 5-6. The pocket 32 may be machined into the body 26 of a previously eroded template 14, to produce a template 14 according to the present invention.

The pad 30 is made of an electrically conductive material with hardness greater than that of the body 26 and the electrode 10 itself. In the exemplary template 14, a carbide alloy material available from Rogers Tool Works Incorporated for example, with hardness between approximately (600-1000) on the Brinell hardness scale, was used. The carbide alloy material of the pad 30 is less susceptible to spark erosion caused by the dressing process than the material of the electrode 10.

The pad 30 is bonded to the body 26 using a bonding means 34 that does not negatively affect the electrical conductivity at their interface. Brazing, welding or other suitable bonding means may be used. For example, a low-temperature AMS 4770 braze was used to bond the pad 30 to the body 26 of the exemplary template 14. AMS 4770 braze material comprises the following nominal composition:

| | |
|---|---|
| Silver | 50% |
| Cadmium | 18% |
| Zinc | 16.5% |
| Copper | 15.5% |

If braze is used as the bonding means 34, the pad 30 may subsequently be removed or repositioned by reheating the braze material to a temperature sufficiently above its melting point.

The pad 30 may be positioned at any angle (Alpha) with the base 28 in order to properly dress the eroded end 12. Since the article may be positioned at any orientation for EDM drilling, the angle (Alpha) is not limited.

During the dressing process, one or more electrodes 10 with eroded tips 12 are first advanced in the holder 16 beyond dressed length (L), which is the distance from the holder 16 to the dressed tips 18. A DC current 20 pulses between the eroded tips 12, and the template pad 30. After a period of time, the eroded end 12 is shaped into a dressed end 18 with a predetermined length (L) and angle (Alpha), produced by a dressing plane 22 and a dressing angle (Alpha) of the pad 30. Because the pad 30 is less susceptible to spark erosion, the dressed tips 18 have a more consistent length (L) and angle (Alpha), and the template 14 is replaced less frequently.

While the present invention has been described in the context of specific embodiments thereof, other alternatives, modifications and variations will become apparent to those skilled in the art having read the foregoing description. Accordingly, it is intended to embrace those alternatives, modifications and variations as fall within the broad scope of the appended claims.

What is claimed is:

1. A template for dressing an eroded end of an EDM electrode comprising:

a body, wherein said body material hardness is between 50-100 on the Brinell hardness scale;

a pad bonded to said body for dressing the eroded end of the electrode; and wherein said pad has a material hardness that is greater than the material hardness of said body.

2. The template of claim 1 wherein said body material is copper alloy.

3. The template of claim 1 wherein said body comprises a pocket and wherein said pad is bonded to said body in said pocket.

4. A template for dressing an eroded end of an EDM electrode comprising:

a base for locating the template in an EDM machine;

an electrically conductive body extending from the base, wherein said body material hardness is between 50-100 on the Brinell hardness scale, an electrically conductive pad bonded to said body for dressing the eroded end of the electrode; and wherein said pad has a material hardness that is greater than the material hardness of said body.

5. The template of claim 4 wherein said body material is copper alloy.

6. The template of claim 4 wherein said body comprises a pocket and wherein said pad is bonded to said body in said pocket.

* * * * *